(12) United States Patent
Ishii et al.

(10) Patent No.: US 9,598,120 B2
(45) Date of Patent: Mar. 21, 2017

(54) VEHICLE INTERIOR BOARD AND METHOD FOR MANUFACTURING THE SAME

(71) Applicant: MORIDEN Co., Ltd., Tokyo (JP)

(72) Inventors: Junichi Ishii, Ota (JP); Toru Kodaira, Ota (JP)

(73) Assignee: MORIDEN CO., LTD., Tokyo (JP)

( * ) Notice: Subject to any disclaimer, the term of this patent is extended or adjusted under 35 U.S.C. 154(b) by 600 days.

(21) Appl. No.: 14/126,990

(22) PCT Filed: Dec. 27, 2012

(86) PCT No.: PCT/JP2012/008365
§ 371 (c)(1),
(2) Date: Dec. 17, 2013

(87) PCT Pub. No.: WO2014/102867
PCT Pub. Date: Jul. 3, 2014

(65) Prior Publication Data
US 2016/0200372 A1  Jul. 14, 2016

(51) Int. Cl.
*B62D 29/04* (2006.01)
*B60R 13/01* (2006.01)
*B29C 45/14* (2006.01)
*B62D 25/20* (2006.01)
*B32B 5/18* (2006.01)
(Continued)

(52) U.S. Cl.
CPC ........ *B62D 29/04* (2013.01); *B29C 45/14508* (2013.01); *B32B 5/022* (2013.01);
(Continued)

(58) Field of Classification Search
CPC ...... B62D 29/04; B62D 25/02; B60R 13/013; B60R 13/011; B60R 2013/018; B29C 45/14508; B32B 5/245; B32B 15/02; B32B 5/022; B32B 15/046; B32B 27/065; B32B 27/32; B32B 5/18; B32B 2262/101; B32B 2266/0278; B32B 2262/0284;
(Continued)

(56) References Cited

U.S. PATENT DOCUMENTS 2,148,176 A * 2/1939 Schroeder ............... A47F 11/00
229/90
4,194,313 A * 3/1980 Downing .............. B29C 53/063
16/225
(Continued)

FOREIGN PATENT DOCUMENTS

DE   3704377 A * 12/1987
EP   2520410 A1   11/2012
(Continued)

*Primary Examiner* — Jeanette E Chapman
(74) *Attorney, Agent, or Firm* — Banner & Witcoff, Ltd.

(57) ABSTRACT

Included are a first board and a second board that include hard polyurethane foam layers and formed respectively in spaces sandwiched between pairs of thin plates, and a coupling member having a porous structure where a recessed groove is formed, parts of the coupling member being arranged in the spaces. The hard polyurethane foam layers are also formed in gaps between the thin plates and the coupling member to join the boards to the coupling member. Consequently, the step of molding the first board can mold, join, and integrate the boards, and mold a bendable, lightweight, and very strong vehicle interior board.

5 Claims, 9 Drawing Sheets

(51) Int. Cl.
  *B32B 5/02* (2006.01)
  *B32B 5/24* (2006.01)
  *B32B 15/04* (2006.01)
  *B32B 15/20* (2006.01)
  *B32B 27/06* (2006.01)
  *B32B 27/32* (2006.01)
  *B29K 75/00* (2006.01)
  *B29L 31/30* (2006.01)

(52) U.S. Cl.
  CPC ............... *B32B 5/18* (2013.01); *B32B 5/245* (2013.01); *B32B 15/046* (2013.01); *B32B 15/20* (2013.01); *B32B 27/065* (2013.01); *B32B 27/32* (2013.01); *B60R 13/011* (2013.01); *B60R 13/013* (2013.01); *B62D 25/20* (2013.01); *B29K 2075/00* (2013.01); *B29L 2031/3005* (2013.01); *B32B 2262/0284* (2013.01); *B32B 2262/101* (2013.01); *B32B 2266/0278* (2013.01); *B32B 2605/003* (2013.01); *B60R 2013/018* (2013.01)

(58) Field of Classification Search
  CPC ......... B32B 2605/003; B29K 2075/011; B29L 2031/3005
  See application file for complete search history.

(56) References Cited

U.S. PATENT DOCUMENTS

| | | | | |
|---|---|---|---|---|
| 4,507,348 | A | * | 3/1985 | Nagata ............... B32B 3/28 108/57.25 |
| 4,711,046 | A | * | 12/1987 | Herrgord ............ G09F 15/0068 160/135 |
| 4,906,510 | A | * | 3/1990 | Todor, Jr. ............ B29C 53/06 108/51.3 |
| 5,535,558 | A | * | 7/1996 | Rieke .................. E04D 13/174 454/365 |
| 7,690,158 | B2 | * | 4/2010 | Kelly .................. E04B 2/7429 181/291 |
| 2011/0239505 | A1 | * | 10/2011 | Fink .................. G09F 15/0068 40/606.15 |

FOREIGN PATENT DOCUMENTS

| | | |
|---|---|---|
| JP | 2001354069 A | 12/2001 |
| JP | 2002144477 A | 5/2002 |
| JP | 2006182208 A | 7/2006 |
| JP | 2009018513 A | 1/2009 |
| JP | 2011136664 A | 7/2011 |

* cited by examiner (A)

(B)

(A)

(B)

(C)

(A)

(B)

VEHICLE INTERIOR BOARD AND METHOD FOR MANUFACTURING THE SAME

CROSS-REFERENCE TO RELATED APPLICATION

The present application is a U.S. National Phase filing of International Application No. PCT/JP2012/008365 filed on Dec. 27, 2012, designating the United States of America, and this application claims the benefit of the above-identified application, which is incorporated by reference herein in its entirety.

TECHNICAL FIELD

The present invention relates to a vehicle interior board used for a floorboard and the like of the luggage compartment of a vehicle, and a method for manufacturing the vehicle interior board. In particular, the present invention relates to a vehicle interior board including a bendable hinge portion, and a method for manufacturing the vehicle interior board.

BACKGROUND ART

Conventionally, RIM (Reaction Injection Molding) is known as a method for manufacturing a vehicle's floorboard (for example, Patent Literature 1). The vehicle's floorboard according to the method includes a first steel plate, a second steel plate, and a hard polyurethane foam layer sandwiched between these steel plates.

A board including a multi-layer structure formed by RIM is thin, lightweight, and very strong. In addition, the board can be manufactured at low cost.

Furthermore, a deck board 200 illustrated in FIG. 10 is known as an example of a vehicle interior board including a bendable hinge portion (for example, Patent Literature 2).

A floor portion of a rear luggage compartment of a van type vehicle is provided with a recess where a spare tire and the like are stored. The deck board 200 covers the recess and serves as a floor surface of the luggage compartment. The deck board 200 is divided into a front board 220 and a rear board 230. A plurality of middle hinges 260 rotatably couples a rear end of the front board 220 to a front end of the rear board 230.

Such a configuration permits only a part of the divided board (the rear board 230) to be opened and closed. Thus, luggage and the like that are stored below the deck board 200 can be easily taken out.

Moreover, a reinforcing pipe 213, a reinforcing rib 214, and outer peripheral flanges 221 and 231 are disposed on a back surface of the deck board 200. Consequently, the stiffness of the deck board 200 is secured.

CITATION LIST

Patent Literatures

Patent Literature 1: JP-A-2002-144477 (p. 3, FIG. 1)
Patent Literature 2: JP-A-2001-354069 (p. 2, FIG. 2)

SUMMARY OF THE INVENTION

Problems to be Solved by the Invention

However, there is a problem with the board including the multi-layer structure molded by RIM that the board itself cannot be bent. Hence, if bending is required, the board is divided. For example, as in the conventional technique illustrated in FIG. 10, the divided boards (the front board 220 and the rear board 230) are essentially coupled with a plurality of hinge parts (the middle hinges 260) prepared separately.

Furthermore, the step of forming the boards separately is required in the method where the divided boards are coupled with the hinge parts being the separate parts. Furthermore, the step of assembling the entire board is required other than the step of molding each part. The step of coupling the boards and the hinge parts has a problem in that work of positioning parts, fixing the parts, and the like is very complicated. Hence, assembling of boards after separately molding them and coupling them with each other leads to a decrease in production efficiency of the vehicle interior board, while increasing the rate of occurrence of assembly failure and the cost of production.

Furthermore, the conventional vehicle interior board requires a large number of parts including hinge parts fastening parts. In other words, there is a problem in that the number of parts is large. Thus, the parts should be individually processed and managed, and such requirements also become factors of increasing production costs.

Moreover, the boards are formed by dividing. Hence, there is a problem of decreases in strength of the opposite ends and surrounding portions thereof (hereinafter, referred to as "edges") of the adjacent boards. A reinforcing member (for example, the reinforcing pipe 213 illustrated in FIG. 10) can also be provided to secure strength around the coupling portion. In this case, however, the number of parts is further increased and the weight of the product is increased.

In addition, the above-mentioned edges between the boards, which are not fixed to the hinge part, may deform. Thus, unevenness may be caused on the surface of the board around the coupling portion of the board, causing a problem in that the flatness of the surface of the board reduces, and the product is defiled.

The present invention has been made in consideration of the above circumstances. An object of the present invention is to provide a vehicle interior board including a bendable hinge portion and having a small number of parts and excellent productivity as well as being lightweight and very strong.

Solutions to the Problems

A vehicle interior board in the present invention includes: a first board and a second board each including a pair of thin plates and a hard polyurethane foam layer formed in a space between the thin plates; and a coupling member configured to couple the first board and the second board, wherein the coupling member includes a porous structure having a recessed groove formed in at least one main surface thereof. A part of an area on one end side of the coupling member with respect to the recessed groove is arranged in the space of the first board, and joined to the first board while a part of an area on the other end side opposite to the one end side with respect to the recessed groove is arranged in the space of the second board, and joined to the second board. The hard polyurethane foam layers are also formed in gaps between the thin plates and the coupling member to join the first board and the second board to the coupling member.

In addition, a method for manufacturing a vehicle interior board in the present invention is the method for manufacturing the vehicle interior board constructed by arranging at least a first board and a second board in plane, and coupling parts of the first and second boards with a coupling member. The method includes the steps of: preparing a porous structure to be the coupling member, and forming injection holes penetrating from one main surface to the other main surface, respectively, in parts of areas on both end sides; preparing a pair of thin plates to be the first board and a pair of thin plates to be the second board, arranging one main surfaces of the pair of thin plates opposed to each other with a predetermined distance away while sandwiching the area on the one end side of the coupling member, where the injection hole is formed, between parts of the thin plates to be the first board, and sandwiching the area on the other end side between parts of the thin plates to be the second board; and injecting liquid raw material of hard polyurethane foam into a space sandwiched between the thin plates to cause a reaction, and forming a hard polyurethane foam layer. The step of forming the hard polyurethane foam layer includes supplying the liquid raw material also to gaps between the thin plates and the coupling member through the injection holes to form the first and second boards while joining and integrating the first and second boards and the coupling member.

Effects of the Invention

According to a vehicle interior board and a method for manufacturing the same of the present invention, edges of a coupling member are respectively inserted between thin plates constituting a first and a second board. Hard polyurethane foam layers included in the first and second boards join the first and second boards to the coupling member. Hence, the step of molding the first board enables the second board to be molded concurrently as well as enabling the first and second boards and the coupling board to be joined and integrated. Thus, the manufacturing process of the vehicle interior board can be simplified, while the process can suppress the occurrence of failure, thereby improving the productivity.

Furthermore, a recessed groove is formed in the coupling member and used as a hinge portion to make the vehicle interior board bendable. Thus, there is no need to separately prepare many hinge parts, fastening parts for fixing the hinge parts, and the like. The number of parts of the vehicle interior board can be therefore reduced.

In addition, the whole opposite ends of the first and second boards are joined to the coupling member, and integrated into one piece. Thus, a sufficient strength can be secured around the coupling portion of the boards. Hence, a reinforcing part and the like are not required separately in the vicinity of the coupling portion of the boards. An increase in the number of parts can be therefore suppressed, allowing the board to be lightweight.

Furthermore, an injection hole is formed in the portion of the coupling member sandwiched between the thin plates. Thus, the hard polyurethane foam layer is also formed in the joint portion of the coupling member and the thin plate, and the injection hole to firmly joint the first and second boards and the coupling portion can be therefore firmly joined.

Moreover, a honeycomb structure is adopted as the porous structure included in the coupling member. The injection hole includes a cavity portion of the honeycomb structure, and openings that are formed in face plates and communicate with the cavity portion. Thus, the parts of the coupling member can be easily processed, and exert sufficient joint strength.

Still furthermore, a liquid raw material of hard polyurethane foam is injected from one of the first and second board sides, and supplied to the other side through the cavity portion of the coupling member. Thus, the liquid raw material can be efficiently supplied to the entire board without forming a complicated injection port in a mold. Therefore, the liquid raw material can be easily supplied even if the boards are further divided to provide a plurality of coupling members and to cause an increase in number of places of bendable hinges.

DESCRIPTION OF EMBODIMENTS

Hereinafter, a vehicle interior board according to an embodiment of the present invention will be described in detail with reference to the drawings.

Figure 1:
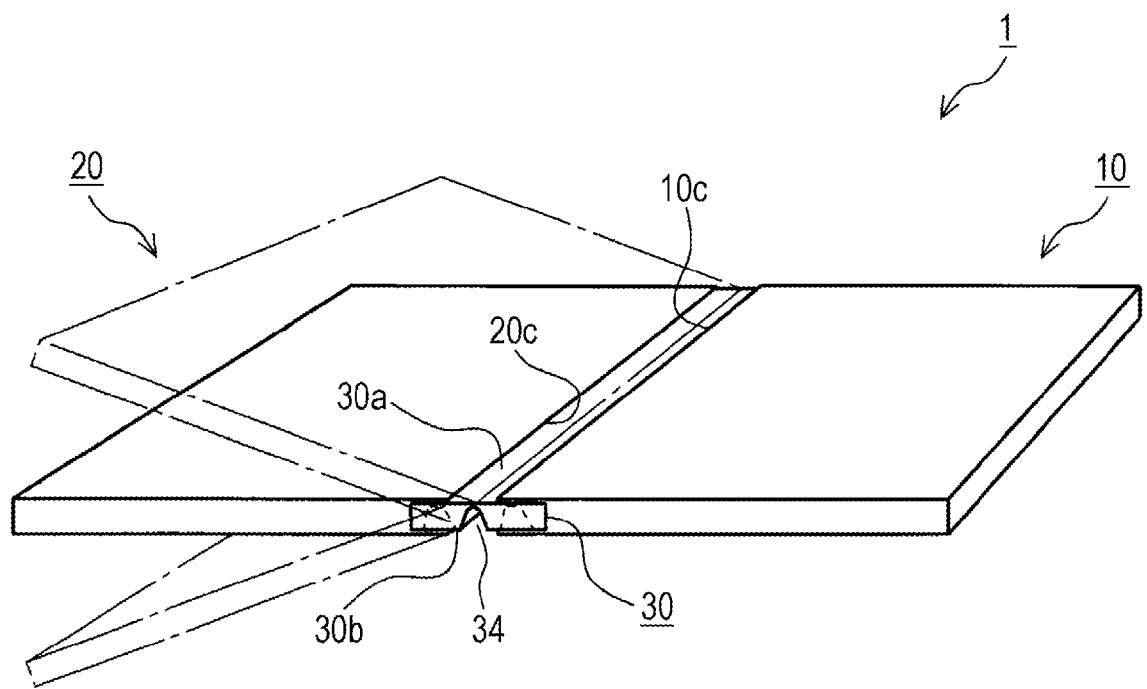
FIG. 1 is a perspective diagram illustrating a general structure of a vehicle interior board according to an embodiment of the present invention.
Figure 2:
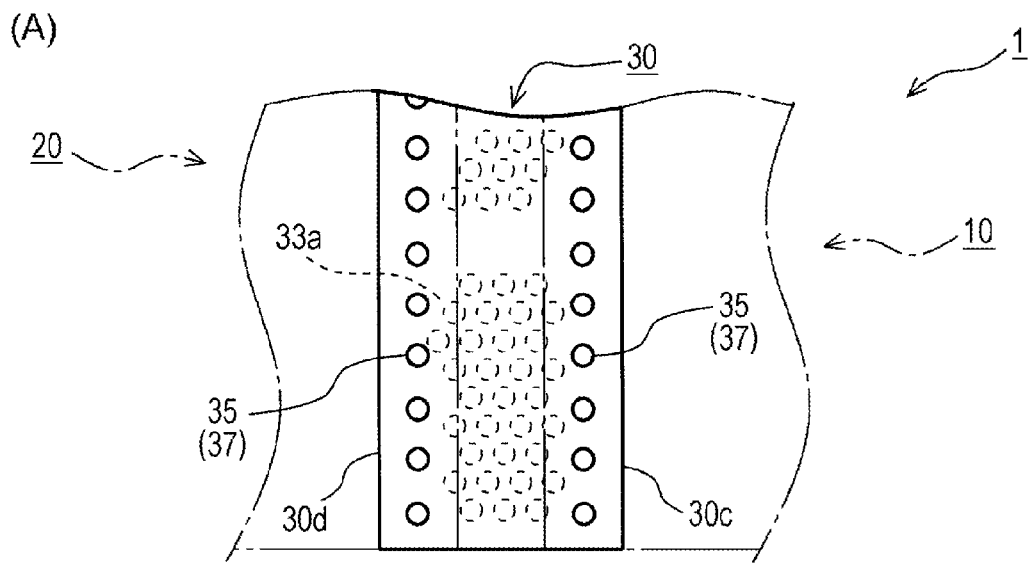
FIG. 2A is a top view of a general structure of a coupling member according to the embodiment of the present invention.
FIG. 2B is a cross-sectional view thereof.
FIG. 2C is an enlarged cross-sectional view of an injection hole portion.
Figure 2:
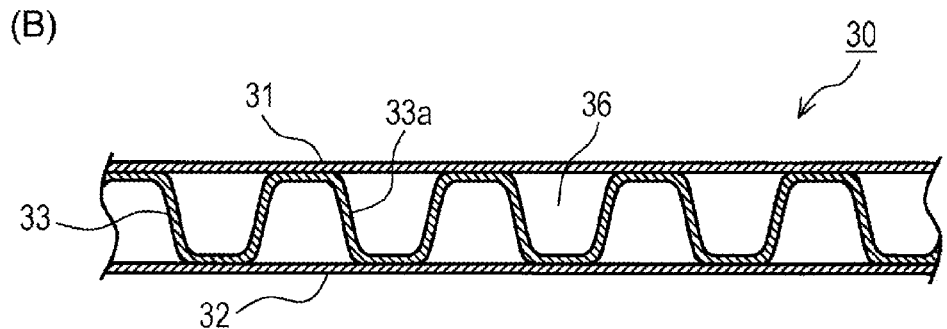
Figure 2:
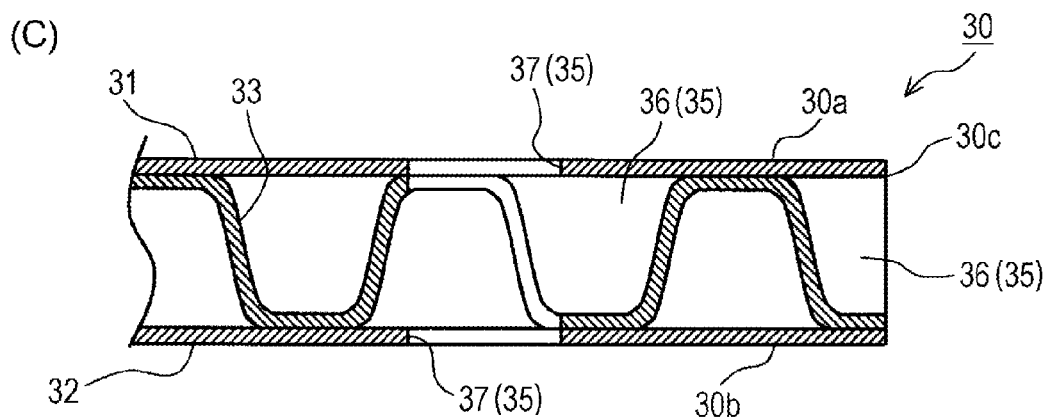
Figure 3:
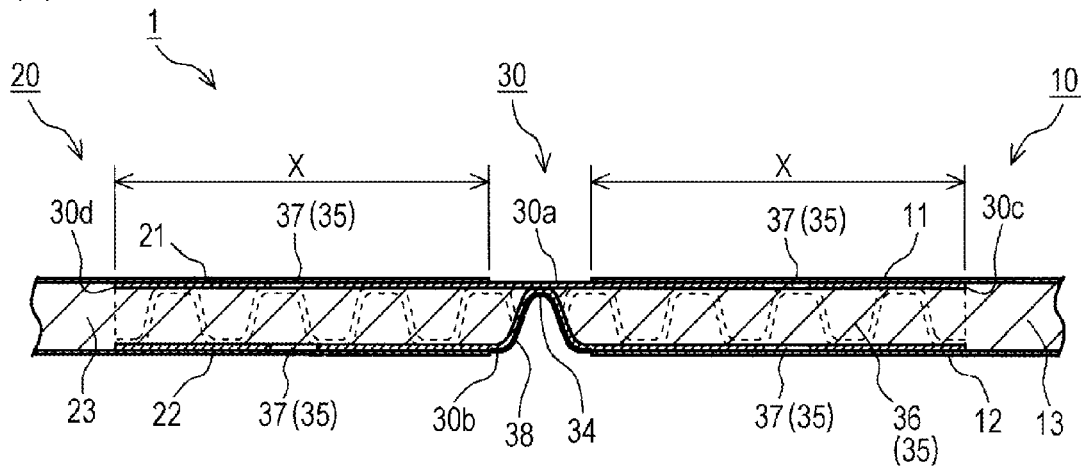
FIG. 3A is a cross-sectional view of the vicinity of a coupling portion of the vehicle interior board according to the embodiment of the present invention.
FIG. 3B is an enlarged cross-sectional view of a general structure of the vicinity of the coupling portion of the first board.
Figure 3:
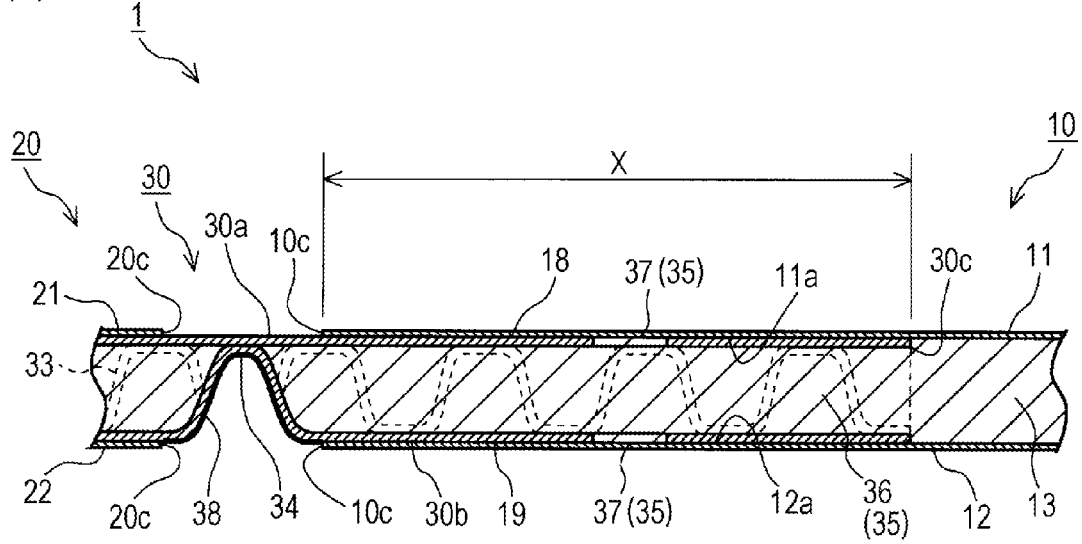

First, a configuration of a vehicle interior board 1 will be described in detail with reference to FIGS. 1 to 3B. FIG. 1 is a perspective diagram schematically illustrating a general structure of the vehicle interior board 1. The vehicle interior board 1 is used, for example, as a floorboard of a luggage compartment of an automobile. The vehicle interior board 1 is molded in a predetermined outline shape depending on the use.

As illustrated in FIG. 1, the vehicle interior board 1 is configured by coupling a first board 10 and a second board 20 with a coupling member 30. A recessed groove 34 is formed in one main surface 30b of the coupling member 30. The recessed groove 34 extends linearly along an end 10c of the first board 10 or an end 20c of the second board 20. Thus, the vehicle interior board 1 can be bent using the recessed groove 34 as a hinge portion.

The direction in which the vehicle interior board 1 is bent may be any of a direction of the main surface 30b with the recessed groove 34 formed therein, and a direction of a main surface 30a opposite to the recessed groove 34. If the vehicle interior board 1 is bent in the direction in which the recessed groove 34 is formed, a bending angle can be regulated within a predetermined range. On the other hand, if the vehicle interior board 1 is bent toward the opposite side of the recessed groove 34, a large bending angle can be secured. A main surface where the recessed groove 34 is formed and a bending direction are appropriately selected depending on the use.

A carpet or the like is attached to the main surface of the vehicle interior board 1 as a finish skin material (not shown). The finish skin material may be any of nonwoven fabrics or the like made of polyethylene terephthalate (PET), nonwoven fabrics made of other materials, fiber fabrics, and various kinds of other sheet materials.

FIG. 2A is a top view of a general structure of the coupling member 30 according to the embodiment of the present invention. FIG. 2B is a partial cross-sectional view thereof. FIG. 2C is an enlarged cross-sectional view of the vicinity of an injection hole 35.

As illustrated in FIG. 2B, the coupling member 30 includes a pair of face plates 31 and 32, and a core material 33 sandwiched between the face plates 31 and 32. The coupling member 30 is a flat plate-shaped honeycomb structure (porous structure) with a thickness of approximately 3 to 30 mm. A cavity portion 36 is formed in a surrounding space of the core material 33 sandwiched between the face plates 31 and 32. Thus, the vehicle interior board 1 can exert predetermined strength while reducing its weight.

The core material 33 is a thin structure. A plurality of substantially cylindrical support walls 33a is formed in the core material 33 and arranged substantially vertical to the face plates 31 and 32. As illustrated in FIG. 2A, the substantially cylindrical support walls 33a are arranged at predetermined intervals and formed over the entire coupling member 30. The cavity portions 36 around the outsides of the support walls 33a has substantially cylindrical shapes and communicate with each other.

In the embodiment, polypropylene resin (PP) is adopted as material of the face plates 31 and 32 and the core material 33. The resin material has advantages of easy availability and excellent processability. In addition, the resin material can also be used for the use that requires water resistance. The material of the face plates 31 and 32 and the core material 33 is not limited to this, but other resin materials, paper, and the like can also be used.

Furthermore, the core material 33 of the honeycomb structure in the coupling member 30 may have another support wall arrangement structure such as one having a hexagonal shape or square shape. Moreover, the coupling member 30 is not limited to the honeycomb structure. The coupling member 30 may be provided with a cavity between the face plates 31 and 32. For example, the core material 33 may be another filler such as a wave-shaped plate or a fiber filler. Additionally, the coupling member 30 may be a flat plate-shaped porous structure made of foamed resin material or the like.

As illustrated in FIG. 2A, parts of areas on both end sides of the coupling member 30 are edges to be joined to the first and second boards 10 and 20. The injection holes 35 are formed in the edges. As illustrated in FIG. 2C, openings 37 that communicate with the cavity portion 36 are formed in the face plates 31 and 32, thereby forming the injection hole 35. The injection hole 35 penetrates from the one main surface 30a of the coupling member 30 through the openings 37 and the cavity portion 36 to the other main surface 30b.

Furthermore, as illustrated in FIG. 2A, an end surface 30c of the coupling member 30 is joined to the first board 10. An end surface 30d of the coupling member 30 is joined to the second board 20. The cavity portions 36 of the injection holes 35 open toward the end surfaces 30c and 30d. In other words, the injection hole 35 is formed to communicate spaces outside the main surfaces 30a and 30b of the coupling member 30 communicate with spaces outside the end surfaces 30c and 30d.

FIG. 3A is an enlarged cross-sectional view schematically illustrating a general structure of the vicinity of the coupling portion of the vehicle interior board 1. FIG. 3B is an enlarged cross-sectional view enlarging and illustrating the coupling portion of the first board 10.

As illustrated in FIG. 3A, the first and second boards 10 and 20 are plate-shaped bodies with a multi-layer structure. The first board 10 includes a pair of thin plates 11 and 12, and a hard polyurethane foam layer 13 sandwiched between the thin plates 11 and 12. The second board 20 includes a pair of thin plates 21 and 22, and a hard polyurethane foam layer 23 sandwiched between them. The adoption of such a structure can make the first and second boards 10 and 20 very strong and lightweight.

Various sheet materials including metal thin plates such as steel plates or aluminum plates, glass cloth, carbon, resin and other fiber materials, a composite material, and the like can be used for the thin plates 11, 12, 21, and 22. In the embodiment, flat zinc plating steel plates with a thickness of approximately 0.08 to 0.18 mm are used as the thin plates 11, 12, 21, and 22. In the drawings, for the purpose of description, the thicknesses of the thin plates 11, 12, 21, and 22 are illustrated large. In this manner, the thin plates 11, 12, 21, and 22 are very thin. Hence, as illustrated in FIG. 3B, the level differences at the ends 10c of the thin plates 11 and 12, and the level differences at the ends 20c of the thin plates 21 and 22 do not matter in terms of the quality of the product. In other words, the surface in the vicinity of the coupling portion of the vehicle interior board 1 is substantially flat.

A part of the coupling member 30 is arranged in a space formed between the thin plates 11 and 12 or between the thin plates 21 and 22. The part is the above-mentioned edge joined to the first board 10 or the second board 20, where the injection holes 35 are formed. In other words, the edge on one end side of the coupling member 30 is sandwiched between the thin plates 11 and 12. The edge on the other end side of the coupling member 30 is sandwiched between the thin plates 21 and 22 (see FIG. 6). The edges on both end sides of the coupling member 30 include portions overlapping with the thin plates 11 and 12 and with the thin plates 21 and 22, respectively. The overlapping portion is represented by an "overlap allowance X". The size of the "overlap allowance X" is, for example, approximately 20 to 100 mm.

The hard polyurethane foam layers 13 and 23 are also formed in the cavity portions 36 and the openings 37 that serve as the injection holes 35 of the coupling member 30. Furthermore, the hard polyurethane foam layer 13 is also formed in contact areas of the thin plates 11, 12, 21, and 22 with the coupling member 30. The contact area is represented by the overlap allowance X. The portion joined to the first board 10 is enlarged and illustrated in FIG. 3B. As illustrated in FIG. 3B, the hard polyurethane foam layer 13 is also formed in gaps 18 and 19. The gap 18 is formed by a surface 11a of the thin plate 11 and the main surface 30a of the coupling member 30, which are opposed to each other. The gap 19 is formed by a surface 12a of the thin plate 12 and the main surface 30b of the coupling member 30, which are opposed to each other. The joint portion of the second board 20 and the coupling member 30 are also similar. Thus, the first and second boards 10 and 20 and the coupling member 30 are joined firmly.

As described above, the recessed groove 34 having a substantially V- or U-shaped cross section is formed in the one main surface 30b of the coupling member 30. The recessed groove 34 serves as a bendable hinge portion. The recessed groove 34 is linearly formed along the ends 10c of the first board 10 or the ends 20c of the second board 20. The recessed groove 34 is formed between the ends 10c of the first board 10 (the ends of the thin plates 11 and 12) and the ends 20c of the second board 20 (the ends of the thin plates 21 and 22). The cross-sectional shape of the recessed groove 34 is not limited to this.

Furthermore, a skin material 38 is attached to at least the groove inner surface of the recessed groove 34. The details are described below. Moreover, a finish skin material (not illustrated) with a predetermined thickness is attached to the main surface of the vehicle interior board 1 depending on the use.

In this manner, in the vehicle interior board 1 of the present invention, the first and second boards 10 and 20, and the coupling member 30 are directly joined using the hard polyurethane foam layers 13 and 23 as joint materials. The coupling member 30 is provided with the recessed groove 34 as a hinge. Thus, there is no need to separately prepare many hinge parts, fastening parts for fixing the hinge parts, and the like. The number of parts of the vehicle interior board 1 can be therefore reduced.

Furthermore, the whole opposing edges of the first and second boards 10 and 20 are joined in a substantially band form by the coupling member 30, and integrated into one piece. Hence, the edges of the boards 10 and 20 can be prevented from deforming. Moreover, the vehicle interior board 1 can be prevented from having an uneven surface.

Moreover, a sufficient strength can be secured around the coupling portion of the boards without providing a reinforcing part and the like separately in the vicinity of the coupling portion of the boards. Hence, an increase in the number of parts can be suppressed, and the vehicle interior board 1 can be reduced in weight.

Figure 4:
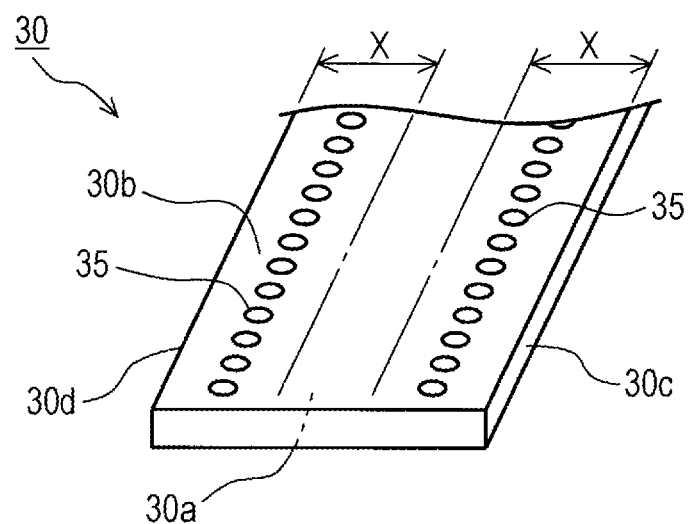
FIG. 4A is a perspective diagram illustrating the processing of an injection hole of the coupling member according to the embodiment of the present invention.
FIG. 4B is a perspective diagram illustrating the attachment of a skin material.
Figure 4:
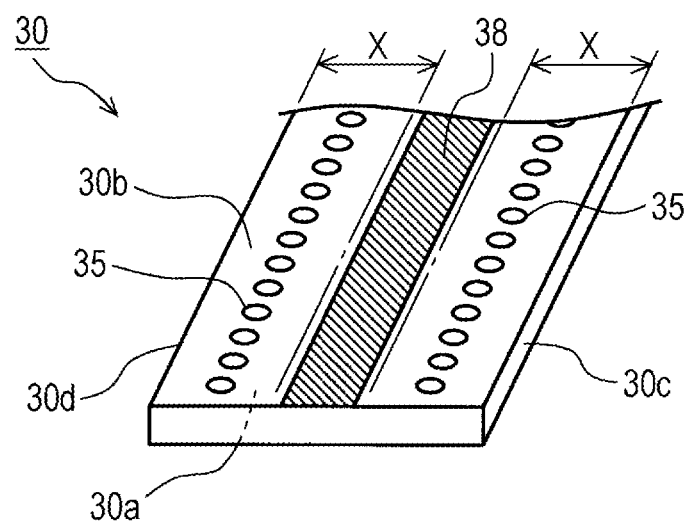
Figure 5:
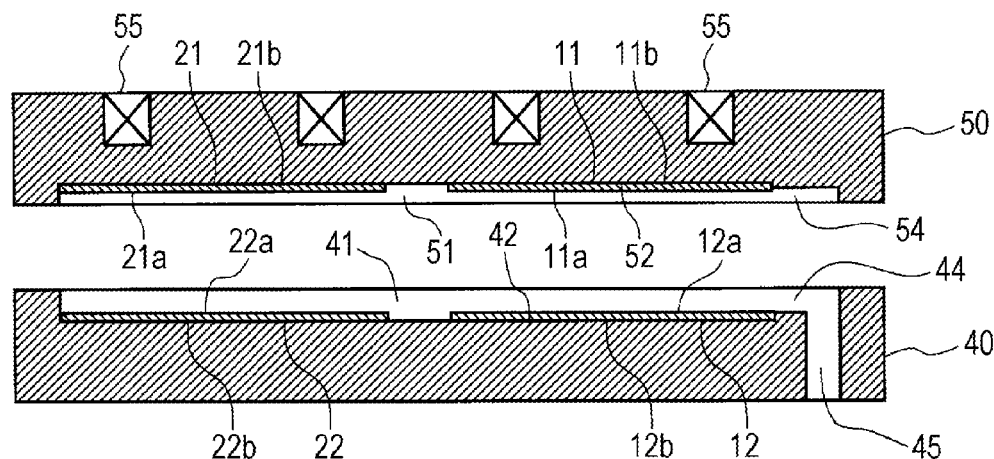
FIG. 5A is a cross-sectional view of a molding apparatus of the vehicle interior board according to the embodiment of the present invention in a state where thin plates are set.
FIG. 5B is a cross-sectional view thereof in a state where the coupling member is set.
FIG. 5C is a cross-sectional view thereof in a state where hard polyurethane foam layers are formed.
Figure 5:
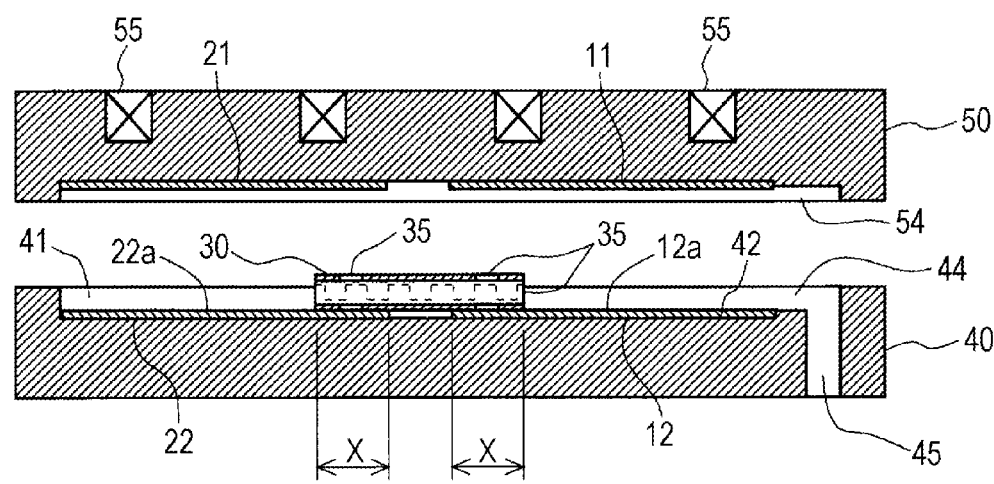
Figure 5:
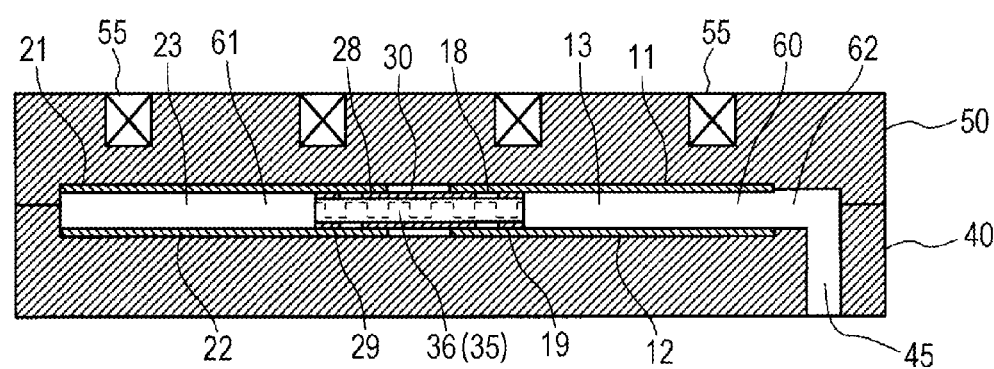

Next, a method for manufacturing the vehicle interior board 1 will be described in detail with reference to FIGS. 4A to 8. FIG. 4A is a perspective diagram illustrating the processing of the injection hole 35 of the coupling member 30. FIG. 4B is a perspective diagram illustrating the attachment of the skin material 38. In FIGS. 4A and 4B, the illustration of the internal structure of the coupling member 30 is omitted.

First, as illustrated in FIG. 4A, a flat plate-shaped material including a porous structure is prepared as the coupling member 30. The injection holes 35 are formed in the edge joined to the first board 10 and in the edge joined to the second board 20. The injection hole 35 is processed by, for example, shearing by a press machine. The process is performed by punching a through hole (the openings 37) that penetrates from the main surface 30a through to the main surface 30b of the coupling member 30.

Next, as illustrated in FIG. 4B, the skin material 38 is attached to the main surface 30b. The skin material 38 is attached to at least a position where the recessed groove 34 (see FIG. 3A and the like) is formed. For example, various sheet-shaped materials such as a nonwoven fabric made of PET can be used for the skin material 38, similarly to the above-mentioned finish skin material. Thus, an inner surface of the recessed groove 34 can be prevented from melting and a burr from being created in the undermentioned step of forming the recessed groove 34. Naturally, it does not matter that the skin material 38 is attached to the whole main surface 30b or 30a of the coupling member 30. Furthermore, the step of attaching the skin material 38 may be executed prior to the above-mentioned step of forming the injection hole 35. Moreover, the step of attaching the skin material 38 may be executed immediately prior to the undermentioned step of forming the recessed groove 34.

FIG. 5A is a cross-sectional view of a RIM apparatus that molds the vehicle interior board 1 in a state where the thin plates 11, 12, 21, and 22 are set. FIG. 5B is a cross-sectional view thereof in a state where the coupling member 30 is set. FIG. 5C is a cross-sectional view thereof in a state where the hard polyurethane foam layers 13 and 23 are formed.

First, a primer (for example, a polyester coating or various primers of a chemical reaction type, volatile solvent type, water vaporing type, and hot melt type) is applied to one main surfaces 11a, 12a, 21a, and 22a of the thin plates 11, 12, 21, and 22 that have been cut in a predetermined outline shape, and dried.

Next, as illustrated in FIG. 5A, the pretreated thin plates 11 and 21 are set in a recess 51 of an upper mold 50. At this point, with the main surfaces 11a and 21a to which the primer has been applied face down, the other main surfaces 11b and 21b are brought into contact with a setting surface 52. The steel thin plates 11 and 21 are attracted by the magnetic force of electromagnets 55 provided in the upper mold 50 and held by the upper mold 50. If, for example, a non-magnetic material such as aluminum is used for the thin plates 11 and 21, the thin plates 11 and 21 may be held by vacuum unit.

Moreover, the pretreated thin plates 12 and 22 are similarly set in a recess 41 of a lower mold 40. At this point, with the main surfaces 12a and 22a to which the primer has been applied face up, the other main surfaces 12b and 22b are brought into contact with a setting surface 42. An electromagnet, vacuum unit, or the like may also be provided in the lower mold 40 to hold the thin plates 12 and 22.

In the drawings, for the purpose of description, the thicknesses of the thin plates 11, 12, 21, 22, and the like are illustrated large and schematically. As described above, the thin plates 11, 12, 21, and 22 are very thin. Hence, the level differences on the setting surface 42 at the ends of the thin plates 12 and 22 and the level differences on the setting surface 52 at the ends of the thin plates 11 and 21 are very small.

Next, as illustrated in FIG. 5B, the coupling member 30 is set in the recess 41 of the lower mold 40. At this point, one edge of the coupling member 30, where the injection holes 35 have been formed, is arranged so as to overlap with the predetermined overlap allowance X on the main surface 12a at the edge of the thin plate 12. Moreover, the other edge of the coupling member 30 is arranged so as to overlap with the predetermined overlap allowance X on the main surface 22*a* at the edge of the thin plate 22.

Figure 6:
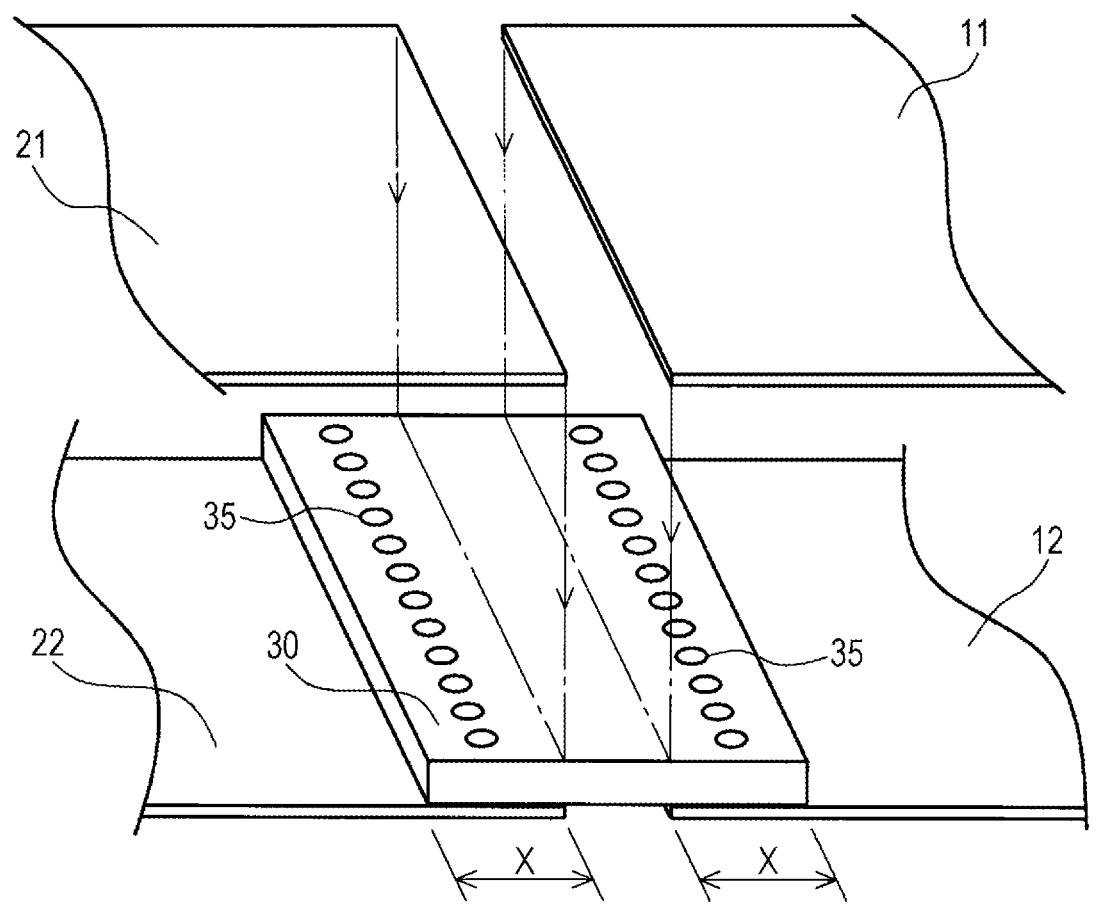
FIG. 6 is a perspective diagram illustrating the arrangement of the coupling member of the vehicle interior board according to the embodiment of the present invention.
Figure 7:
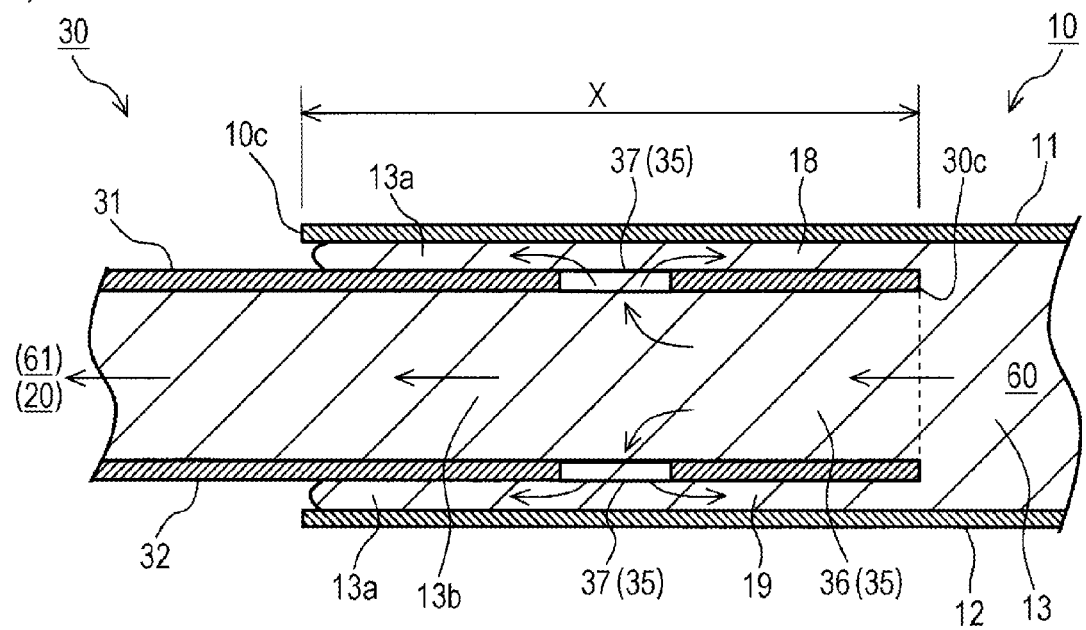
FIG. 7A is an enlarged cross-sectional view of the vicinity of the coupling portion of the first board, illustrating the formation of the hard polyurethane foam layers of the vehicle interior board according to the embodiment of the present invention.
FIG. 7B is a top view of the vicinity of the coupling portion.
Figure 7:
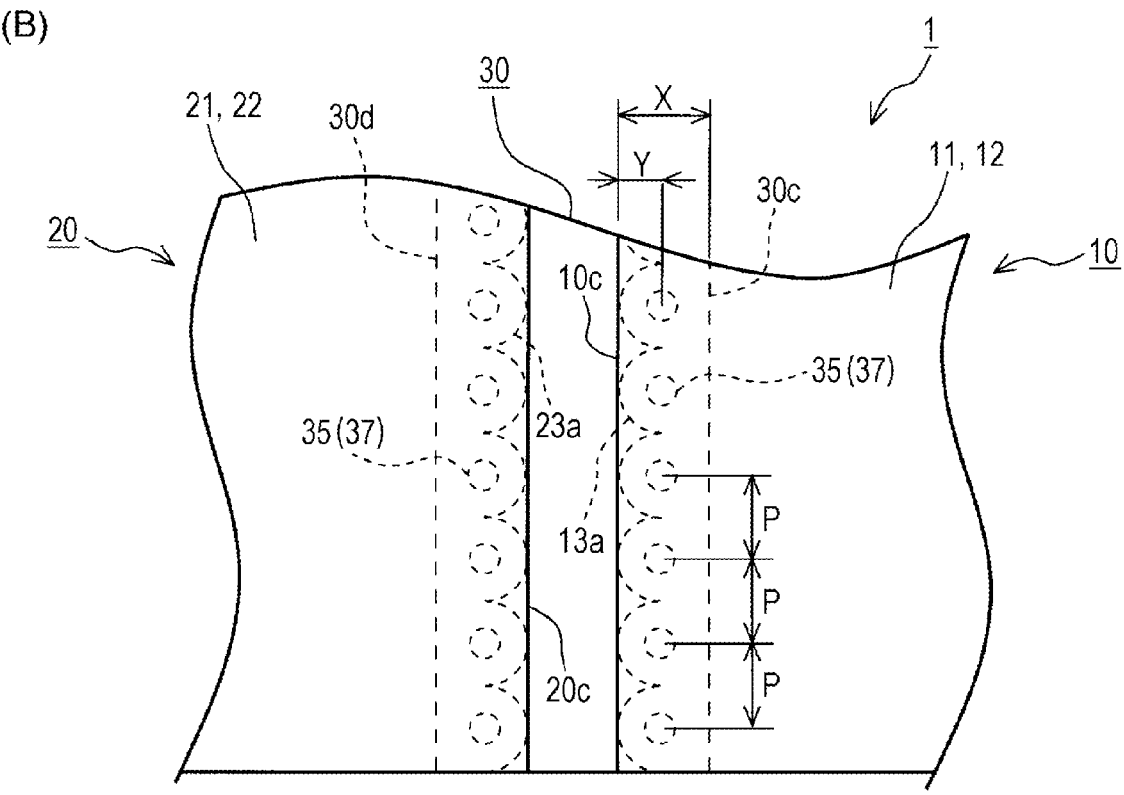

Next, as illustrated in FIG. 5C, the upper mold 50 is lowered. Consequently, as illustrated in FIG. 6, one edge of the coupling member 30 is sandwiched between the edges of the thin plates 11 and 12. At the same time, the other edge of the coupling member 30 is sandwiched between the edges of the thin plates 21 and 22.

As illustrated in FIG. 5C, a molding space 60 is formed between the thin plates 11 and 12. A molding space 61 is similarly formed between the thin plates 21 and 22. Moreover, at the same time, an injection path 62 that communicates with the molding space 60 is formed by an injection channel 44 provided in the lower mold 40 and an injection channel 54 provided in the upper mold 50 (see FIG. 5B), and an injection port 45 provided in the lower mold 40.

The molding space 60 communicates with the molding space 61 through the cavity portions 36 of the coupling member 30. Hence, by lowering the upper mold 50, a space communicating from the injection port 45 to the molding space 61 sequentially through the injection path 62, the molding space 60, and the cavity portions 36.

The liquid material of hard polyurethane foam (in other words, mixed liquid materials including isocyanate and polyol) is injected into the molding space 60 from the injection port 45 through the injection path 62. Consequently, the liquid raw material can be supplied to the molding space 60, the cavity portions 36, and the molding space 61.

It may be configured to inject the liquid raw material also directly to the molding space 61 by providing a plurality of the injection ports 45 for injecting the liquid raw material. It is necessary to supply the liquid raw material directly to the molding spaces 60 and 61, especially if closed-cell foam is adopted as a porous structure included in the coupling member 30.

The lower mold 40 and the upper mold 50 are maintained by unillustrated heat unit at a predetermined temperature (60 to 80° C.). Consequently, the liquid raw material injected into the molding spaces 60 and 61 and the cavity portions 36 is heated in the molding spaces 60 and 61, and the like to cause a chemical reaction, and foam and cure. As a consequence, the hard polyurethane foam layers 13 and 23, and the like are formed.

FIG. 7A is an enlarged cross-sectional view of the vicinity of the coupling portion of the first board 10. The figure illustrates the formation of the hard polyurethane foam layer 13 and the like. FIG. 7B is a top view of the vicinity of the coupling portion of the first and second boards 10 and 20.

As illustrated in FIG. 7A, the liquid raw material injected into the molding space 60 on the first board 10 side flows into the cavity portions 36 opening toward the end surface 30*c* side of the coupling member 30. As described above, the cavity portions 36 of the coupling member 30 communicate with the molding space 61 on the second board 20 side. Hence, the liquid raw material is supplied to the molding space 61. In other words, the coupling member 30 functions as a path for supplying to the second board 20 side the liquid raw material supplied to the first board 10 side.

Moreover, the liquid raw material injected into the molding space 60 is supplied to the gaps 18 and 19 formed between the thin plates 11 and 12 and the coupling member 30 through the injection holes 35 each including the openings 37 formed in the face plates 31 and 32, and the cavity portion 36. The liquid raw material flowing into the gaps 18 and 19 spread in a substantially circular form around the injection holes 35 in the gaps 18 and 19 as illustrated by a reference numeral 13*a* in FIG. 7B.

As illustrated in FIGS. 7A and 7B, the liquid raw material supplied to the cavity portions 36, and the gaps 18 and 19 reacts to foam and cure. Consequently, hard polyurethane foam layers 13*b* and 13*a* are also formed in the cavity portions 36, and the gaps 18 and 19. As a consequence, the first board 10 and the coupling member 30 can be joined firmly using the hard polyurethane foam layers 13*a* and 13*b* as joint members.

Especially, the forming of the injection hole 35 makes it possible to secure large joint areas of the hard polyurethane foam layers 13*a* that join the thin plates 11 and 12 to the coupling member 30 as illustrated in FIG. 7B. Thus, the joint strength of the first board 10 and the coupling member 30 can be further increased.

The same as the above shall apply to the joint locations of the second board 20 and the coupling member 30. In other words, the liquid raw material is supplied to gaps 28 and 29 (see FIG. 5C) formed between the thin plates 21 and 22 (see FIG. 5C and the like) and the coupling member 30. Thus, hard polyurethane foam layers 23*a* are formed and spread in a substantially circular form around the injection holes 35, thereby securing large joint areas of the hard polyurethane foam layers 23*a* that join the thin plates 21 and 22 to the coupling member 30. Therefore, the joint strength of the second board 20 and the coupling member 30 can be further increased.

It is desired that an interval P (pitch) of the arrangement of the openings 37 be equal to or less than the size of the overlap allowance X in order to increase the joint strength of the first and second boards 10 and 20, and the coupling member 30. Moreover, it is preferred that distances Y between the central positions of the openings 37, and the ends 10*c* and 20*c* of the thin plate 11, 12, 21, and 22 be approximately a third to half of the overlap allowance X. Such an arrangement is adopted to enable a reduction in the amount of the liquid raw material that flows out of the thin plates 11, 12, 21, and 22. In addition, large joint areas of the hard polyurethane foam layers 13*a* and 23*a* can be secured.

Furthermore, as described above, the primer is applied in advance to the main surfaces 11*a*, 12*a*, 21*a*, and 22*a* (see FIG. 5A) to be the inner sides of the thin plates 11, 12, 21, and 22. Thus, the joints between the hard polyurethane foam layers 13 and 23, and the thin plates 11, 12, 21, and 22 become strong. Hence, the strength of the first and second boards 10 and 20 can be increased, and the joint strength between the first and second boards 10 and 20 and the coupling member 30 can be further increased.

When the molding of the hard polyurethane foam layers 13 and 23 is completed, the holding of the electromagnets 55 (see FIG. 5C and the like) is released to lift up the upper mold 50 (see FIG. 5C and the like). The vehicle interior board 1 is then removed from the lower mold 40 (see FIG. 5C and the like).

Figure 8:
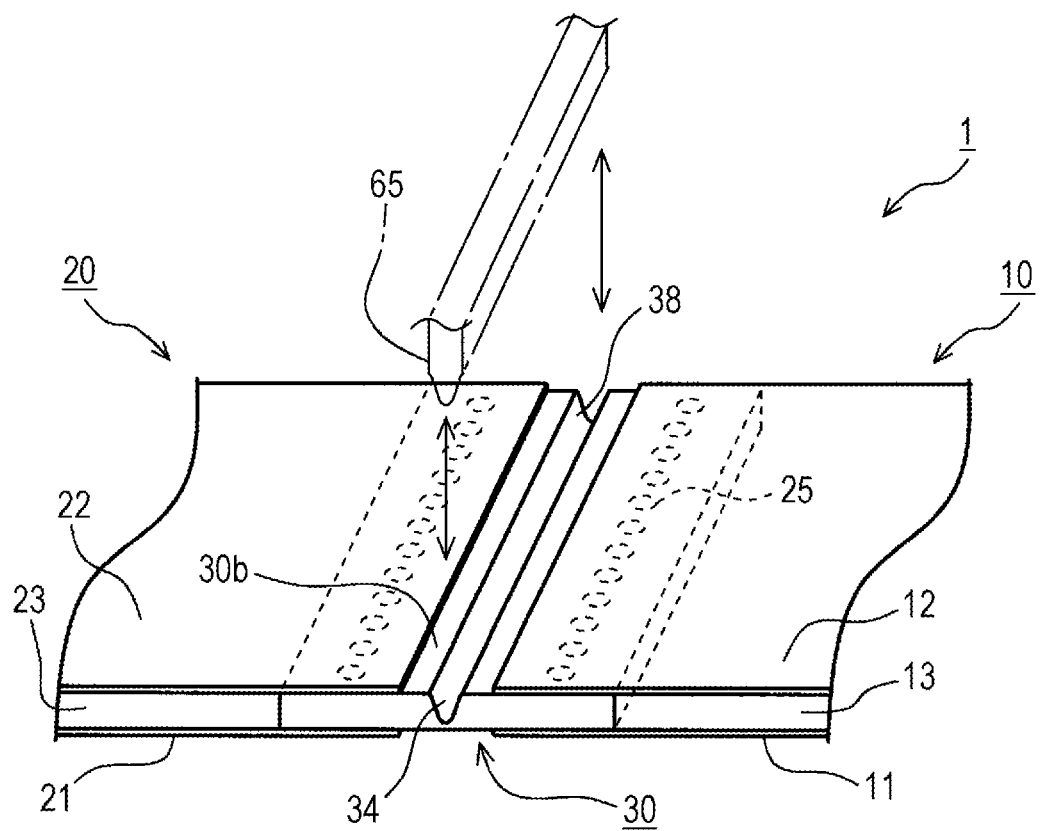
FIG. 8 is a perspective diagram illustrating the processing of a recessed groove of the vehicle interior board according to the embodiment of the present invention.

FIG. 8 is a perspective diagram illustrating the processing of the recessed groove 34 of the vehicle interior board 1. As illustrated in FIG. 8, a heat blade 65 (press mold) heated to a high temperature (for example, approximately 190 to 230° C.) is pressed against the main surface 30*b* of the coupling member 30. The heat blade 65 has a straight shape with a predetermined cross-sectional shape. Thus, the recessed groove 34 is formed.

The recessed groove 34 may be processed using a processing apparatus (heat blade processing machine) that is different from the RIM apparatus (see FIG. 5A) or a manufacturing apparatus that serves also as the heat blade processing machine and the RIM machine by mounting the heat blade 65 on the RIM apparatus.

In this manner, the step of forming the recessed groove 34 is executed after the hard polyurethane foam layers 13 and 23 are formed. As described above, therefore, the cavity portions 36 (see FIG. 7A) of the coupling member 30 can serve as the path that supplies the liquid raw material of hard polyurethane foam. Thus, the liquid raw material can be only injected from one of the boards (the first board 10) side and supplied to the other board (the second board 20) side without forming a complicated injection port in a mold.

Furthermore, even if the boards 10 and 20 are further divided, a plurality of the coupling members 30 is provided, and the number of places of bendable hinges is increased, the liquid raw material can be supplied efficiently to the entire board from one injection port.

With the above steps, the vehicle interior board 1 integrated by coupling the first and second boards 10 and 20 via the coupling member 30 including the recessed groove 34 to be a hinge portion is finished. An appropriate finish skin material is subsequently attached to the main surface of the vehicle interior board 1 depending on the use. Thus, a product that is attached to a vehicle and the like is finished.

As described above, according to the vehicle interior board 1 of the present invention, the step of molding the first board 10 includes molding the second board 20 concurrently while joining and integrating the first board 10, the second board 20, and the coupling member 30. Hence, the step of molding the second board 20 and the step of coupling and assembling the first and second boards 10 and 20 become unnecessary apart from the step of molding the first board 10. Hence, the productivity of the vehicle interior board 1 can be improved.

Figure 9:
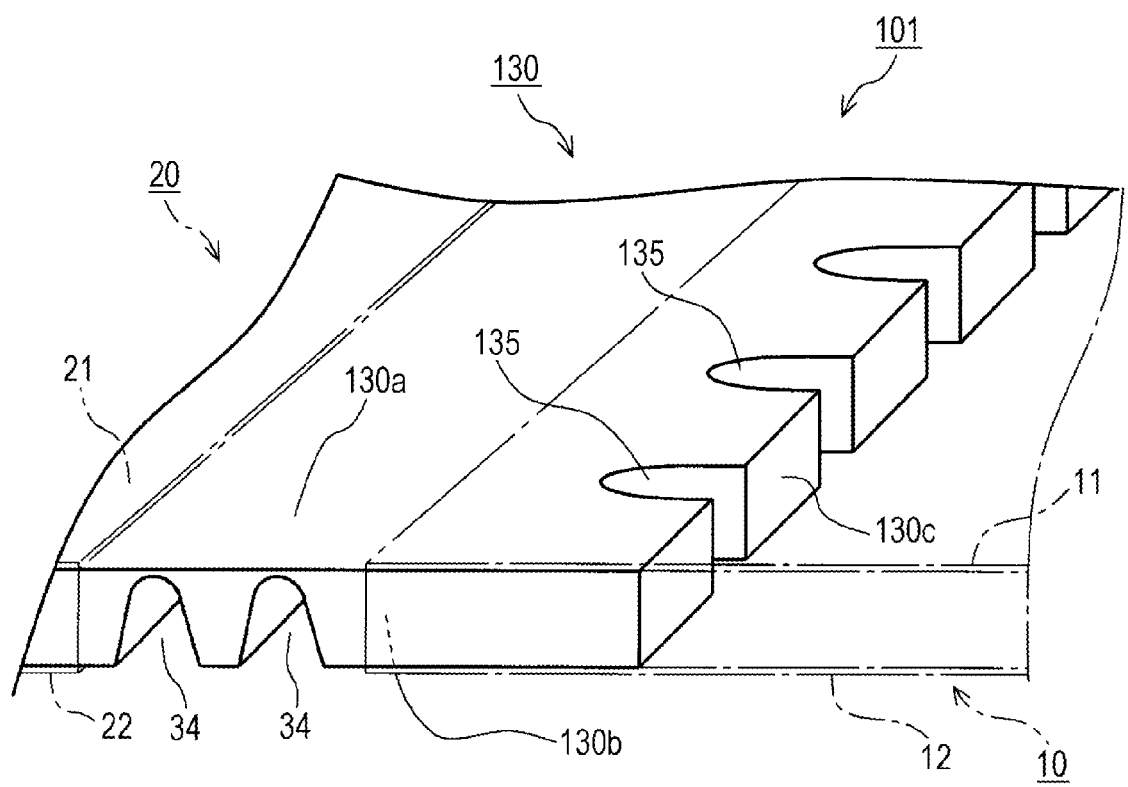
FIG. 9 is a perspective diagram illustrating a general structure of a coupling portion of a vehicle interior board according to another embodiment of the present invention.
Figure 10:
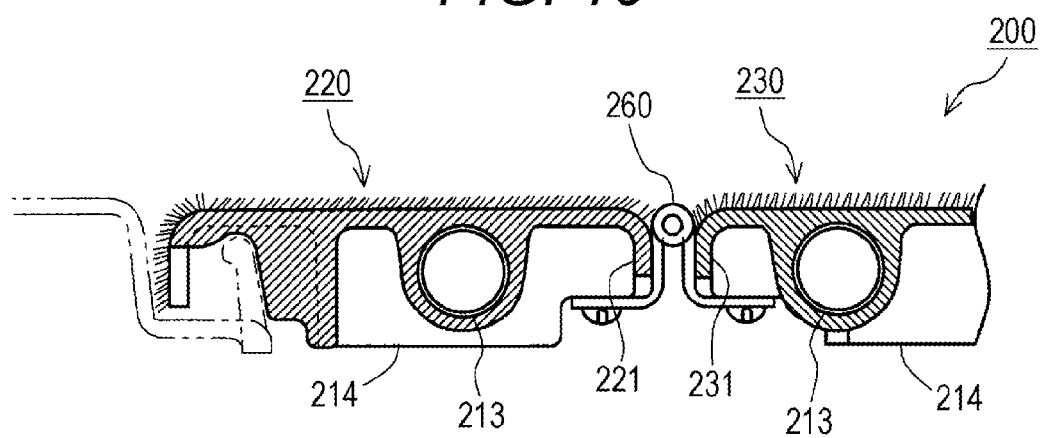
FIG. 10 is an enlarged cross-sectional view of the vicinity of a coupling portion illustrating an example of a vehicle interior board of a known technology.

Next, a modification of the embodiment will be described with reference to FIG. 9. FIG. 9 is a perspective diagram illustrating a general structure of the vicinity of the coupling portion of a vehicle interior board 101 according to another embodiment of the present invention. The same reference numerals are assigned to components that have the same or similar operation and effect as or to the vehicle interior board 1 that has already been described, and their descriptions will be omitted.

As illustrated in FIG. 9, a plurality of the recessed grooves 34 is formed in a coupling member 130. Thus, a larger bending angle of the vehicle interior board 101 can be secured.

Moreover, injection holes 135 that penetrate from one main surface 130a to the other main surface 130b are formed at an edge of the coupling member 130, the edge being connected to the first board 10. The injection hole 135 has a substantially U-shaped cross section that opens toward an end surface 130c side. Although the illustration is omitted, similar injection holes 135 are formed at an edge on a side that joins the second board 20.

In this manner, the injection holes 135 that open toward the end surface 130c side (and the end surface on the second board 20 side) are provided. Even if a closed-cell foam type foam material is adopted as a porous structure included in the coupling member 130, therefore, the first and second boards 10 and 20 can be firmly joined to the coupling member 130. In other words, even with a porous structure where internal cavities do not communicate with each other, liquid raw material of hard polyurethane foam can be supplied efficiently between the coupling member 30 and the thin plates 11, 12, 21, and 22 through the injection holes 135.

Up to this point, in the embodiment, the example where the hard polyurethane foam layers 13 and 23 are formed and then the step of forming the recessed groove 34 is executed has been illustrated with reference to FIGS. 5C and 8. Alternatively, the recessed groove 34 can be also processed prior to the formation of the hard polyurethane foam layers 13 and 23. In that case, the liquid raw material cannot be flown through the cavity portions 36 of the coupling member 30. Hence, it is necessary to provide an injection path separately and supply the liquid raw material directly to the molding spaces 60 and 61.

Moreover, naturally, it does not matter that a flat-shaped porous structure where the recessed groove 34 is formed in advance is prepared (purchased) for a coupling member 30. Moreover, the injection hole 35 and the recessed groove 34 may be similarly processed using a porous structure to which the skin material 38 is attached in advance.

Moreover, the configuration of the RIM apparatus illustrated in FIGS. 5A to 5C is merely a schematic example, and another configuration can be adopted. For example, the upper mold 50 and the lower mold 40 may be rotatably coupled by hinge unit. Moreover, the portion where the coupling member 30 is arranged is not necessarily held by the upper mold 50.

The present invention is not limited to the above embodiment. In addition, various changes can be made to the present invention without departing from the gist of the present invention.

DESCRIPTION OF REFERENCE SIGNS

1, 101 Vehicle interior board
10 First board
11, 12 Thin plate
11a, 12a Main surface of the thin plate
13 Hard polyurethane foam layer
18, 19 Gap
20 Second board
21, 22 Thin plate
21a, 22a Main surface of the thin plate
23 Hard polyurethane foam layer
28, 29 Gap
30 Coupling member
30a, 30b, 130a, 130b Main surface of the coupling member
31, 32 Face plate
33 Core material
34 Recessed groove
35, 135 Injection hole
36 Cavity portion
37 Opening
60, 61 Molding space

The invention claimed is:
1. A vehicle interior board comprising:
a first board and a second board each including a pair of thin plates and a hard polyurethane foam layer formed in a space between the thin plates; and
a coupling member configured to couple the first board and the second board, wherein
the coupling member includes a porous structure having a recessed groove formed in at least one main surface thereof,
a part of an area on one end side of the coupling member with respect to the recessed groove is arranged in the space of the first board, and joined to the first board while a part of an area on the other end side opposite to the one end side with respect to the recessed groove is arranged in the space of the second board, and joined to the second board, and the hard polyurethane foam layers are also formed in gaps between the thin plates and the coupling member to join the first board and the second board to the coupling member;

wherein an injection hole penetrating from the least one main surface opposed to the thin plate through to an opposing main surface of the coupling member is formed in a portion of the coupling member, the portion being sandwiched between the thin plates, and the hard polyurethane foam layer being also formed in the injection hole.

2. The vehicle interior board according to claim 1, wherein the porous structure is a honeycomb structure including at least a pair of face plates, and a core material sandwiched between the face plates, and the injection hole is formed by openings formed in the face plates communicating with a cavity portion sandwiched between the face plates.

3. The vehicle interior board according to claim 1, wherein the recessed groove of the coupling member has a substantially V-shaped cross-section.

4. The vehicle interior board according to claim 1, wherein the recessed groove of the coupling member has a substantially U-shaped cross-section.

5. The vehicle interior board according to claim 1, wherein a skin material is attached to an inner surface of the recessed groove.

* * * * *